(12) United States Patent
Miyazaki et al.

(10) Patent No.: US 10,558,064 B2
(45) Date of Patent: Feb. 11, 2020

(54) OPTICAL COMMUNICATION MODULE AND OPTICAL MODULATOR USED THEREIN

(71) Applicant: Sumitomo Osaka Cement Co., Ltd, Tokyo (JP)

(72) Inventors: Norikazu Miyazaki, Tokyo (JP); Kei Katou, Tokyo (JP)

( * ) Notice: Subject to any disclaimer, the term of this patent is extended or adjusted under 35 U.S.C. 154(b) by 0 days.

(21) Appl. No.: 15/941,026

(22) Filed: Mar. 30, 2018

(65) Prior Publication Data
US 2018/0284494 A1    Oct. 4, 2018

(30) Foreign Application Priority Data
Mar. 31, 2017    (JP) .................................. 2017-072909

(51) Int. Cl.
G02F 1/03      (2006.01)
H04B 10/50     (2013.01)
G02F 1/035     (2006.01)

(52) U.S. Cl.
CPC ............ *G02F 1/0327* (2013.01); *G02F 1/035* (2013.01); *H04B 10/50* (2013.01); *G02F 2202/20* (2013.01)

(58) Field of Classification Search
CPC ....... G02F 1/0327; G02F 1/035; H04B 10/50; G06F 13/42; H04L 7/00
USPC .................................. 398/182, 183, 135, 79
See application file for complete search history.

(56) References Cited

U.S. PATENT DOCUMENTS

| 2002/0186727 A1* | 12/2002 | Aoki | B82Y 10/00 372/26 |
| 2003/0147575 A1* | 8/2003 | Sugiyama | G02F 1/0305 385/2 |
| 2006/0210215 A1* | 9/2006 | Aoki | H04B 10/40 385/14 |
| 2008/0304527 A1* | 12/2008 | Gao | H01S 5/06808 372/38.02 |
| 2009/0047025 A1* | 2/2009 | Hong | H04B 10/40 398/135 |
| 2010/0158530 A1* | 6/2010 | Soto | H04B 10/40 398/79 |
| 2010/0296767 A1* | 11/2010 | Shimizu | G02F 1/2255 385/2 |

(Continued)

FOREIGN PATENT DOCUMENTS

JP    2012048121 A    3/2012
JP    2014195061 A    10/2014

*Primary Examiner* — Oommen Jacob
(74) *Attorney, Agent, or Firm* — IpHorgan Ltd.

(57) ABSTRACT

An optical communication module includes: an optical modulator that includes an optical modulation element housed in a rectangular parallelepiped container; a driver circuit that inputs a high-frequency signal to the optical modulation element; and a housing that houses the optical modulator and the driver circuit. An electrical interface is provided on one lateral surface of the housing, and an optical interface is provided on another lateral surface, which is opposite to the lateral surface, of the housing. In the optical modulator, an end of a wiring substrate, which is configured to introduce the high-frequency signal to the optical modulation element, is led out from one short-side side of the rectangular parallelepiped container, and the driver circuit is disposed between the short-side side of the optical modulator and the electrical interface.

6 Claims, 4 Drawing Sheets

(56) References Cited

U.S. PATENT DOCUMENTS

| | | | |
|---|---|---|---|
| 2010/0316326 A1* | 12/2010 | Sugiyama | G02F 1/225 385/3 |
| 2012/0051683 A1 | 3/2012 | Sugiyama | |
| 2013/0039663 A1* | 2/2013 | LaBounty | G01R 19/2506 398/116 |
| 2014/0049292 A1* | 2/2014 | Popescu | G02B 6/43 327/100 |
| 2014/0104666 A1* | 4/2014 | Minoia | G02F 1/225 359/245 |
| 2015/0043865 A1* | 2/2015 | Velthaus | G02F 1/2255 385/3 |
| 2015/0078758 A1* | 3/2015 | Lee | H04B 10/40 398/135 |
| 2015/0078761 A1* | 3/2015 | Yamaji | G02B 6/4213 398/182 |
| 2015/0104177 A1* | 4/2015 | Kato | H04B 10/40 398/79 |
| 2015/0261019 A1* | 9/2015 | Yoshida | G02F 1/035 385/2 |
| 2015/0342075 A1* | 11/2015 | Oki | G01J 1/44 250/206 |
| 2015/0362687 A1* | 12/2015 | Okamura | G02B 6/30 385/11 |
| 2015/0362823 A1* | 12/2015 | Sugiyama | G02F 1/225 385/3 |
| 2016/0054639 A1* | 2/2016 | Kono | G02F 1/2255 385/2 |
| 2016/0091665 A1* | 3/2016 | Jones | H04Q 11/0005 385/2 |
| 2016/0233961 A1* | 8/2016 | Huh | H04B 10/40 |
| 2016/0266322 A1* | 9/2016 | Epitaux | G02B 6/4292 |
| 2017/0255032 A1* | 9/2017 | Kataoka | G02F 1/03 |
| 2017/0279593 A1* | 9/2017 | Mittal | H04B 10/691 |
| 2018/0067888 A1* | 3/2018 | Sheth | G06F 13/364 |
| 2018/0284494 A1* | 10/2018 | Miyazaki | G02F 1/0327 |
| 2018/0287249 A1* | 10/2018 | Yamagajo | H01Q 1/3275 |

\* cited by examiner

OPTICAL COMMUNICATION MODULE AND OPTICAL MODULATOR USED THEREIN

CROSS-REFERENCE TO RELATED APPLICATIONS

This application claims the benefit of Japanese Patent Application No. 2017-072909 filed Mar. 31, 2017, the disclosure of which is herein incorporated by reference in its entirety.

BACKGROUND OF THE INVENTION

Field of the Invention

The present invention relates to an optical communication module and an optical modulator that is used in the optical communication module, and particularly to an optical communication module in which an optical modulator and a driver circuit are disposed in a housing, and an optical modulator that is used in the optical communication module.

Description of Related Art

In an optical communication field, an optical transmission module in which an optical modulator and a driver circuit are embedded in a housing, or an optical transmission and reception module in which the optical modulator and an optical receiver are embedded in the housing is put into practical use. The optical communication modules are used in a state of being mounted on a board of an optical communication system apparatus, and there is a demand for a small-sized module capable of further increasing a degree of integration so as to correspond to an increase in transmission capacity of the system. In addition, an optical transmission and reception module, which is called pluggable module capable of being inserted and ejected, is used for easiness of system extension and maintenance.

In a typical pluggable module, an electrical interface is provided on one lateral surface of a housing that constitutes the optical communication module, and an optical interface is provided on another lateral surface that is opposite to the one lateral surface. The optical communication module is inserted in a direction horizontal to a panel of the optical communication system apparatus, and is detachably fixed to an inner side of the apparatus in a state in which the electrical interface of the module is inserted around an electrical connection terminal provided on an inner depth side.

In recent years, a data amount processed in an optical communication rapidly increases, and thus it is necessary to apply a coherent communication function of 100 Gbps or more than 100 Gbps to one optical communication module, or to increase the number of modules which are inserted into one board. According to this, even in a high-frequency signal, it is necessary to suppress a propagation loss of the high-frequency signal so as to suppress deterioration of a performance, and the optical communication module is also required to be miniaturized.

However, in a case where optical components such as the optical modulator and electrical components such as the driver circuit are integrally disposed in a narrow space, not only connection between the optical components but also handling of interconnections through which a high-frequency signal propagates become complex, thereby conversely causing performance deterioration of the optical communication module.

SUMMARY OF THE INVENTION

The present invention has been made to solve the above-described problem, and an object thereof is to provide an optical communication module capable of suppressing a propagation loss of a high-frequency signal while realizing miniaturization of the optical communication module, and an optical modulator that is used in the optical communication module.

To accomplish the above-described object, the optical communication module and the optical modulator that is used in the optical communication module according to the invention have the following technical characteristics.

(1) According to an aspect of the invention, there is provided an optical communication module including: an optical modulator that includes an optical modulation element housed in a rectangular parallelepiped container; a driver circuit that inputs a high-frequency signal to the optical modulation element; and a housing that houses the optical modulator and the driver circuit. An electrical interface is provided on one lateral surface of the housing, an optical interface is provided on another lateral surface, which is opposite to the lateral surface, of the housing. In the optical modulator, an end of a wiring substrate, which is configured to introduce the high-frequency signal to the optical modulation element, is led out from one short-side side of the rectangular parallelepiped container. The driver circuit is disposed between the short-side side of the optical modulator and the electrical interface.

(2) In the optical communication module according to (1), an optical receiver may be provided in the housing.

(3) In the optical communication module according to (1) or (2), a digital signal processing circuit may be provided in the housing.

(4) According to another aspect of the invention, there is provided an optical modulator that is used in the optical communication module according to any one of (1) to (3). An optical input port and an optical output port of the optical modulator are disposed on the same surface of the rectangular parallelepiped container or are respectively disposed on surfaces, which are perpendicular to each other, of the rectangular parallelepiped container.

(5) In the optical modulator according to (4), a relay substrate, which is configured to introduce the high-frequency signal from the wiring substrate to the optical modulation element, may be provided inside the container, and the relay substrate may be disposed along a long-side side lateral surface on one side or both sides of the optical modulation element.

(6) In the optical modulator according to (4) or (5), optical path converting means may be disposed on an input side or an emission side of a light beam with respect to the optical modulation element.

(7) In the optical modulator according to (6), a substrate that constitutes the optical modulation element may be a lithium niobate substrate.

(8) In the optical modulator according to any one of (4) to (7), a DC input terminal configured to apply a DC bias to the optical modulation element, or a monitor signal output terminal configured to monitor a light wave propagating through the inside of the optical modulation element may be disposed on one long-side side of the rectangular parallelepiped container.

According to the invention, the optical communication module includes: an optical modulator that includes an optical modulation element housed in a rectangular parallelepiped container; a driver circuit that inputs a high-frequency signal to the optical modulation element; and a housing that houses the optical modulator and the driver circuit. An electrical interface is provided on one lateral surface of the housing; and an optical interface is provided on another lateral surface, which is opposite to the lateral surface, of the housing. In the optical modulator, an end of a wiring substrate, which is configured to introduce the high-frequency signal to the optical modulation element, is led out from one short-side side of the rectangular parallelepiped container, and the driver circuit is disposed between the short-side side of the optical modulator and the electrical interface. Accordingly, it is possible to suppress a propagation loss of a high-frequency signal while realizing miniaturization of the optical communication module.

DETAILED DESCRIPTION OF THE INVENTION

Hereinafter, an optical communication module and an optical modulator that is used in the optical communication module according to the invention will be described in detail with reference to preferred examples.

As illustrated in FIG. 1 to FIG. 4, the optical communication module of the invention includes an optical modulator OM that includes an optical modulation element housed in a rectangular parallelepiped container, a driver circuit Drv that inputs a high-frequency signal to the optical modulation element, and a housing 1 that houses the optical modulator OM and the driver circuit Drv. An electrical interface EI is provided on one lateral surface of the housing, and an optical interface OI is provided on another lateral surface, which is opposite to the lateral surface, of the housing. In the optical modulator OM, an end of a wiring substrate FPC, which is configured to introduce the high-frequency signal to the optical modulation element, is led out from one short-side side of the rectangular parallelepiped container. The driver circuit Drv is disposed between the short-side side of the optical modulator and the electrical interface.

Figure 1:
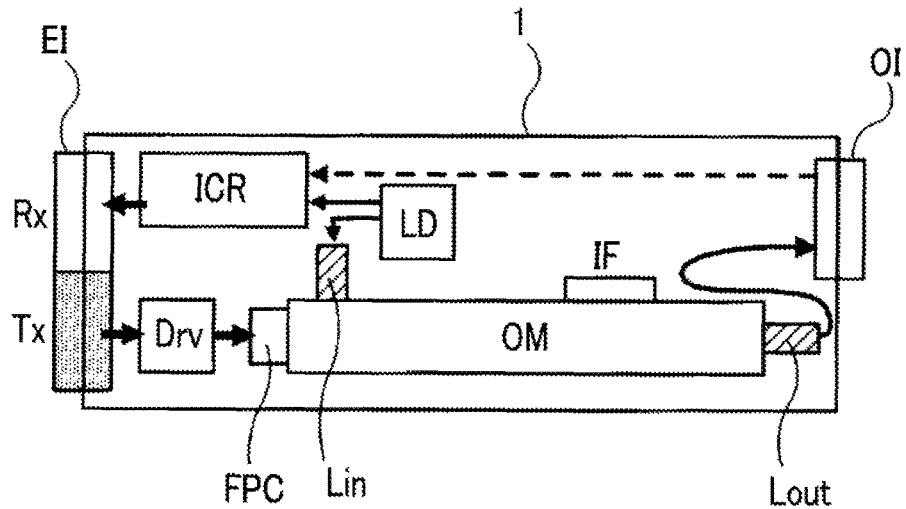
FIG. 1 is a view illustrating a first example of an optical communication module of the invention.

FIG. 1 is a view illustrating a first example of the optical communication module of the invention.

A reference numeral 1 indicates a housing that constitutes the optical communication module. The optical modulator OM, the driver circuit Drv, a semiconductor laser light source LD, and an optical receiver ICR are disposed inside the housing. In addition, the electrical interface EI is provided on a left lateral surface (left side in the drawing) of the housing 1. Tx is a transmission side terminal, and Rx constitutes a reception side terminal.

The driver circuit, the optical modulator, the semiconductor laser light source, and the optical receiver are arranged on a plate-shaped circuit substrate (not illustrated) and are fixed thereto. Arrangement of respective components is performed in an arbitrary manner. However, in the invention, particularly, the electrical interface or the driver circuit is disposed on a short-side side of the optical modulator. When the transmission side terminal Tx of the electrical interface EI, the driver circuit Drv, and the wiring substrate FPC of the optical modulator are disposed on an approximately straight line, and thus it is possible to shorten a high-frequency interconnection. According to this, it is possible to suppress a propagation loss in the high-frequency interconnection. As a result, it is also possible to prevent performance deterioration in the optical communication module.

In the invention, a flexible printed circuit (FPC) is used as the wiring substrate of the optical modulator as disclosed in Japanese Laid-open Patent Publication Nos. 2012-48121 and 2014-195061. As disclosed in Japanese Laid-open Patent Publication Nos. 2012-48121 and 2014-195061, in an optical modulator of the related art, in a rectangular parallelepiped container that constitutes the optical modulator, one end of the wiring substrate FPC is led out from a long-side side. However, in the invention, since the transmission side terminal Tx, the driver circuit Drv, and the wiring substrate FPC of the optical modulator are disposed on an approximately straight line, one end of the wiring substrate FPC is led out from a short-side side of the optical modulator.

In FIG. 1, an arrow is shown from the transmission side terminal Tx to the driver circuit Drv, and from the driver circuit Drv to the wiring substrate FPC. The arrow indicates a flow of a high-frequency signal. In addition, an arrow from the semiconductor laser light source LD to an optical input port Lin of the optical modulator OM indicates an input light beam to the optical modulator. An arrow from an optical output port Lout of the optical modulator to the optical interface OI indicates an emitted light beam from the optical modulator.

An arrow from the optical interface OI to an optical receiver ICR indicates a reception light beam that is input to the optical receiver, and an arrow from the semiconductor laser light source LD to the optical receiver indicates a reference light beam that is used in a coherent communication and the like. In addition, an arrow from the optical receiver ICR to the reception side terminal Rx indicates a reception signal that is output from the optical receiver.

A reference numeral IF on a long-side side of the optical modulator OM represents a DC input terminal configured to apply a DC bias to the optical modulation element, or a monitor signal output terminal configured to monitor a light wave propagating through the inside of the optical modulation element. Hereinafter, an interface including the DC input terminal and/or the monitor signal output terminal is referred to as "DC/monitor interface". The DC/monitor interface is disposed on an upper side of a rectangular parallelepiped container in FIG. 1, but may be provided on a long-side side on a lower side of the container without limitation thereto. The DC/monitor interface has a structure in which connector pins are arranged in parallel, and it is possible to use a DC/monitor interface in which respective connector pins are individually formed, a DC/monitor interface in which a plurality of connector pins are integrated, and the like.

Figure 2:
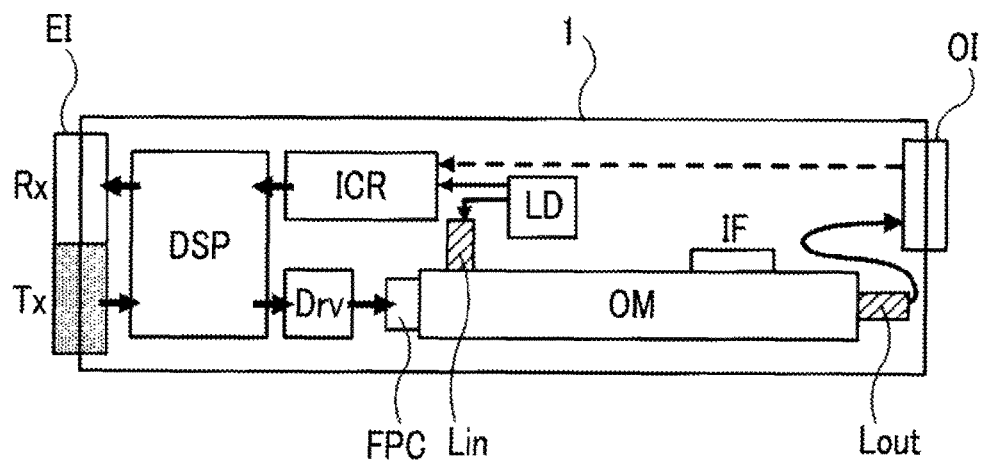
FIG. 2 is a view illustrating a second example of an optical communication module of the invention.

In a second example of the optical communication module as illustrated in FIG. 2, a digital signal processing circuit DSP is embedded in the housing 1 of the optical communication module. The digital signal processing circuit performs signal processing such as multi-value encoding, FEC application, and phase adjustment of a high-frequency signal. In a case where the digital signal processing circuit DSP is disposed in the housing, as illustrated in FIG. 2, the transmission terminal Tx, the digital signal processing circuit DSP, the driver circuit Drv, and the wiring substrate FPC of the optical modulator OM are disposed on a straight line. In addition, a signal of the optical receiver ICR is input to the digital signal processing circuit DSP to perform signal processing such as polarization division, dispersion processing, and phase shift compensation of light source, thereby performing demodulation of a signal that is transmitted, error correction, and the like.

In FIG. 1 and FIG. 2, the optical input port Lin and the optical output port Lout of the optical modulator are respectively provided on a long-side side lateral surface and a short-side side lateral surface of the rectangular parallelepiped container of the optical modulator. Typically, the optical input port and the optical output port are respectively provided on two short-side side lateral surfaces, which are opposite to each other, of the rectangular parallelepiped container. In the invention, since the wiring substrate FPC is disposed on a short-side side of the rectangular parallelepiped container, the optical input port Lin is disposed on the long-side side lateral surface of the rectangular parallelepiped container so as to avoid that the wiring substrate and the optical input port Lin are disposed in combination on the same short-side side lateral surface.

In the invention, the wiring substrate and the optical input port may be disposed in combination on the same short-side side. For example, as illustrated in FIG. 1 or FIG. 2, when the wiring substrate and the optical input port are respectively disposed on surfaces different from each other, it is easy to connect the wiring substrate FPC to the circuit substrate, and it is not necessary to handle an optical fiber that is introduced into the optical input port in a narrow space in which the driver circuit Drv and the electrical interface EI are disposed. Accordingly, assembling of the optical communication module becomes easy.

Figure 3:
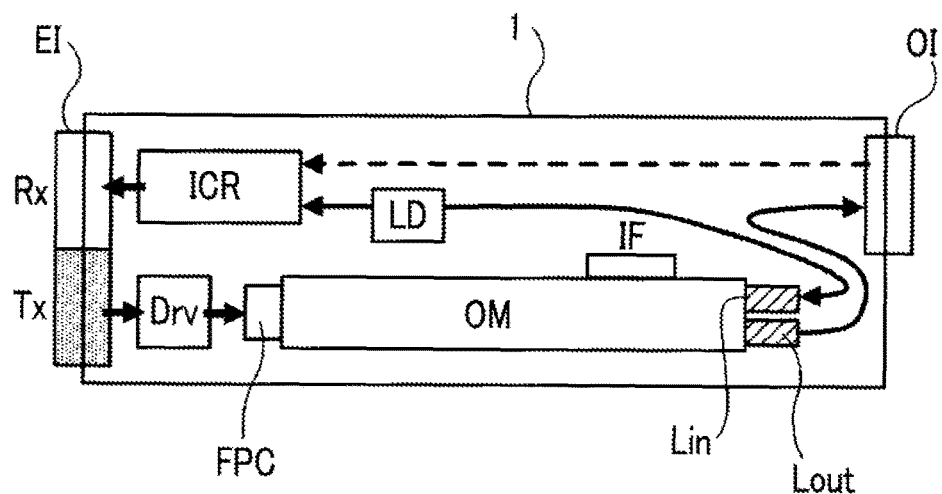
FIG. 3 is a view illustrating a third example of an optical communication module of the invention.

In a third example as illustrated in FIG. 3, the optical input port Lin and the optical output port Lout of the optical modulator OM are provided on the same short-side side lateral surface of the rectangular parallelepiped container.

Figure 4:
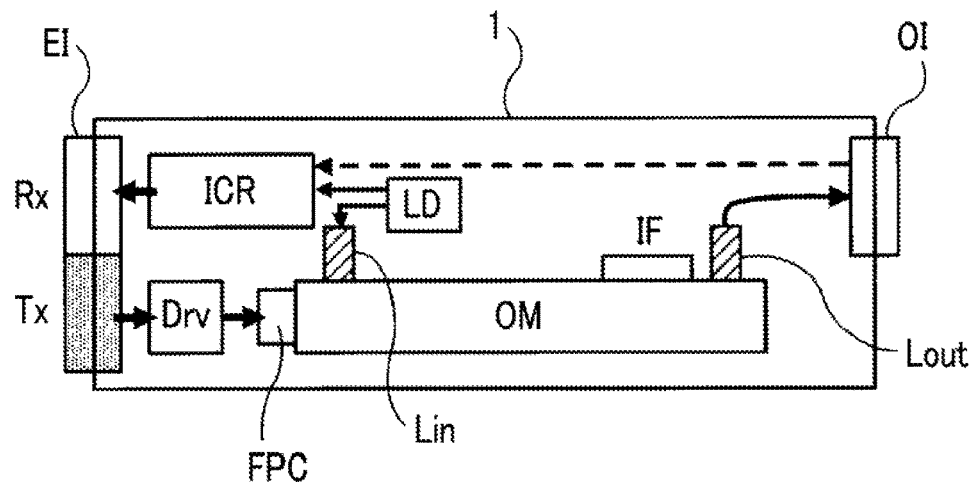
FIG. 4 is a view illustrating a fourth example of an optical communication module of the invention.

In addition, in a fourth example as illustrated in FIG. 4, the optical input port Lin and the optical output port Lout of the optical modulator OM are provided on the same long-side side lateral surface of the rectangular parallelepiped container.

The third example and the fourth example have the same configuration as in FIG. 1 except for the above-described arrangement.

As described above, it is possible to diversify a layout of components in the optical communication module by devising arrangement of the optical input port Lin and the optical output port Lout of the optical modulator OM.

As in the third example illustrated in FIG. 3, when disposing the optical input port and the optical output port on the same short-side side lateral surface, for example, it is necessary to employ a configuration in which two optical modulation elements are disposed in parallel, and a light wave emitted from one of the optical modulation elements is inverted by 180° and is input to the other optical modulation element. In addition, in a case where an outgoing optical waveguide and a returning optical waveguide are formed in parallel on one substrate, it is possible to employ various configurations such a configuration in which a substrate end surface is used as a reflecting surface, a configuration in which a reflective optical system of a GRIN lens is disposed on the substrate end surface, and a configuration in which a waveguide is folded back in a planar waveguide substrate such as a planar light circuit (PLC).

Figure 5:
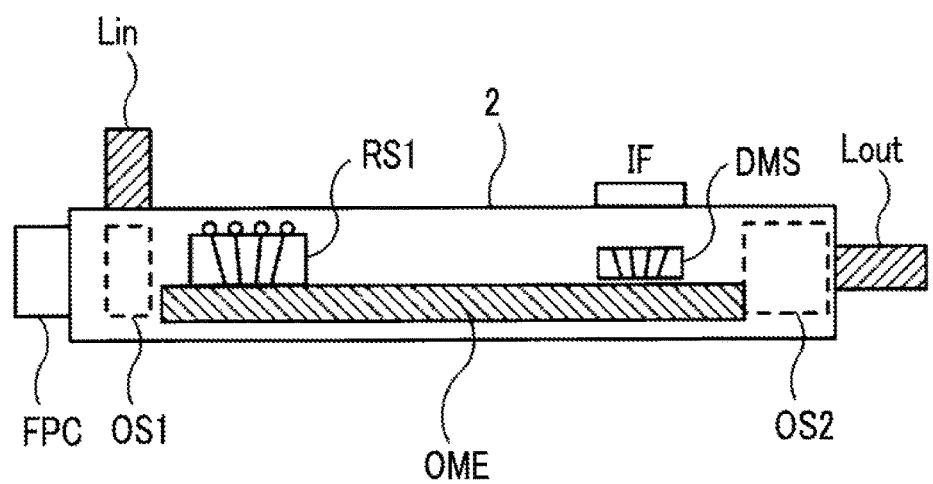
FIG. 5 is a view illustrating a first example of an optical modulator of the invention.
Figure 6:
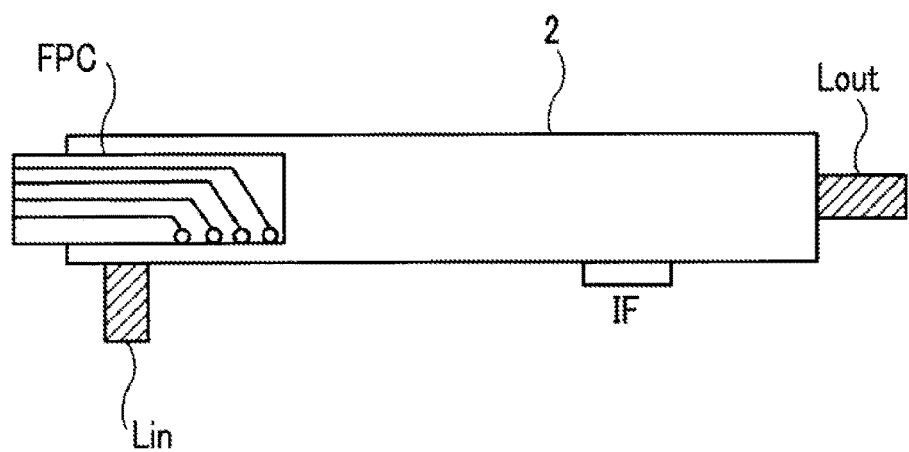
FIG. 6 is a view of the optical modulator in FIG. 5 seen from a bottom surface side.

FIG. 5 and FIG. 6 illustrate a first example of an optical modulator OM that is embedded in the optical communication module. An optical modulation element OME is housed in a rectangular parallelepiped container 2 of the optical modulator. With regard to the optical modulation element, it is possible to employ a technology in the related art. For example, the optical modulation element has a configuration in which an optical waveguide, a modulation electrode, and the like are embedded in a lithium niobate substrate having an electro-optic effect or a semiconductor substrate.

A wiring substrate FPC and a relay substrate RS1 are used when introducing a high-frequency signal to the optical modulation element OME. The relay substrate is provided with an input terminal portion (round mark) and an interconnection (solid line in a rectangular shape). Lead pins, which pass through the bottom surface of a container, are used in electrical connection from the wiring substrate FPC to the relay substrate. For example, connection from terminals indicated by four small round marks of the wiring substrate FPC in FIG. 6 to terminals indicated by four round marks provided in the relay substrate RS1 is performed by the lead pins.

The relay substrate RS1 is disposed only on a single side of the optical modulation element (OME). In addition, in the relay substrate RS1, the entirety of input terminal portions (portions indicated by round marks) are disposed on a lateral surface, which is opposite to a lateral surface facing the optical modulation element OME, of the relay substrate. According to this, a structure of the relay substrate becomes simple. As a result, connection between the terminals become easy, and it is possible to attain manufacturing process efficiency.

As illustrated in FIG. 5 or FIG. 6, the wiring substrate FPC is led out from a short-side side of the rectangular parallelepiped container 2 of the optical modulator. In this case, the other end of the wiring substrate FPC is disposed to extend toward an inner side along the bottom surface of the rectangular parallelepiped container as illustrated in FIG. 6. In a case where the wiring substrate FPC is regarded as a high-frequency interface, it is preferable that a length of the wiring substrate (FPC) in a horizontal direction in the drawing is short.

However, in a case of an optical modulation element using lithium niobate substrate (LN substrate), a branched waveguide or a bent portion of an optical waveguide is lengthened in a longitudinal direction of the LN substrate, and thus the LN substrate also has an elongated shape. In addition, in a case of connecting a distance (several mm to several tens of mm) between a short-side side of the LN substrate and an operation portion of the optical waveguide with high-frequency interconnections on the LN substrate, cross-sectional dimensions of the interconnection are smaller in comparison to a case where high-frequency interconnections having the same length are provided in the wiring substrate FPC. Accordingly, a propagation loss of a high frequency further increases. As a result, it is difficult to realize a wide bandwidth of the optical modulator.

According to this, as illustrated in FIG. 5 and FIG. 6, the relay substrate RS1 is disposed in the vicinity of an initiation portion of the operation portion (portion at which a high-frequency signal is applied to an optical waveguide) of the optical modulation element (OME), and the wiring substrate FPC is extended to a lower side of the relay substrate RS1.

Application of a DC bias to the optical modulation element OME and signal output from a light-receiving element disposed on a substrate of the optical modulation element or at the periphery of the substrate are performed through the DC/monitor interface IF. A relay substrate DMS is used between the DC/monitor interface and the optical modulation element as necessary.

Figure 7:
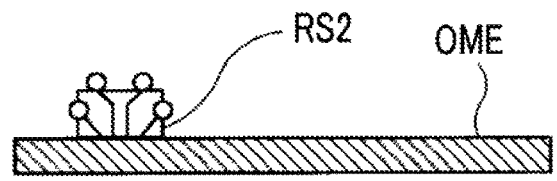
FIG. 7 is a view illustrating an application example of the first example of the optical modulator of the invention.

According to the first example of the optical modulator as illustrated in FIG. 5 and FIG. 6, in the relay substrate RS1, terminal portions (portions indicated by a round mark) which are connected to lead pins are formed on the lateral surface, which is opposite to the lateral surface facing the optical modulation element OME, of the relay substrate. In contrast, as in an application example illustrated in FIG. 7, the terminal portions (portions indicated by a round mark) may be provided on lateral surfaces (right and left lateral surfaces of the relay substrate RS2 in FIG. 7), which are perpendicular to the long-side side lateral surface of the optical modulation element (OME), of a relay substrate RS2 so as to set the electrical interconnection to be shorter. In addition, as illustrated in FIG. 7, an input terminal portion may be disposed on another lateral surface of the relay substrate so as to prevent cross-talk between high-frequency signals. According to this arrangement, it is possible to further decrease a difference in an interconnection length between ports in comparison to a case of FIG. 5 and FIG. 6, and thus it is possible to suppress occurrence of a difference in high-frequency characteristics between ports such as an electrical loss and an increase in skew between ports.

Description will be given of a light beam propagating path of the optical modulator OM. OS1 represents optical path converting means that changes a path of a light wave input from the optical input port Lin by approximately 90° in a direction of the optical modulation element OME. As the optical path converting means, a space optical system, or micro-optics in which a planar light circuit PLC, an optical fiber that is bent in a small radius of curvature, reflecting means such as a prism, and light collection means such as a lens are combined is used.

A semiconductor laser beam is input from the optical input port Lin, and is input to the optical modulation element OME after changing a propagation direction in the optical path converting means OS1. In the optical modulation element, light waves, which are subjected to optical modulation, are emitted from a right end of the optical modulation element in FIG. 5, are combined into one light wave by polarization combining means OS2 in which a wavelength plate, a polarization beam splitter, and the like are combined, and the resultant light wave is emitted from the optical output port Lout. In a case where polarization-combining is not performed, the polarization-combining means OS2 may be omitted.

In addition, as illustrated in FIG. 4, in a case where the optical output port Lout is disposed on the long-side side of the rectangular parallelepiped container of the optical modulator, it is necessary for the reference numeral OS2 to apply a function of the optical path converting means. In addition, in this case, a function of the polarization-combining means is not necessary.

The reason why the optical path converting means (OS1 and the like) is necessary is as follows. In the optical modulation element using a lithium niobate substrate and the like, a size of the substrate increases for bending of the optical path by 90°, and thus it is difficult to miniaturize the optical modulator. According to this, the optical input port and the optical output port in the substrate of the optical modulation element are provided on a short-side side of the substrate, and the optical path is changed by 90° by using the optical path converting means (OS1 and the like).

In addition, when an optical end surface is provided on a short-side side of the LN substrate, it is easy to obtain an optically polished surface. In a case where the optical end surface is provided on a long-side side of the LN substrate, since the length of the LN substrate is approximately several cm, it is difficult to form the optically polished surface over the length.

Figure 8:
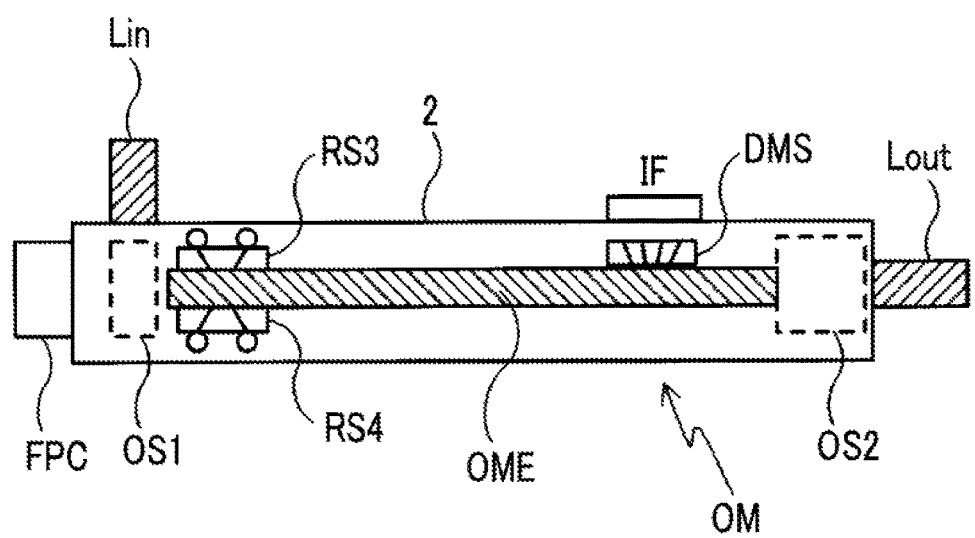
FIG. 8 is a view illustrating a second example of the optical modulator of the invention.
Figure 9:
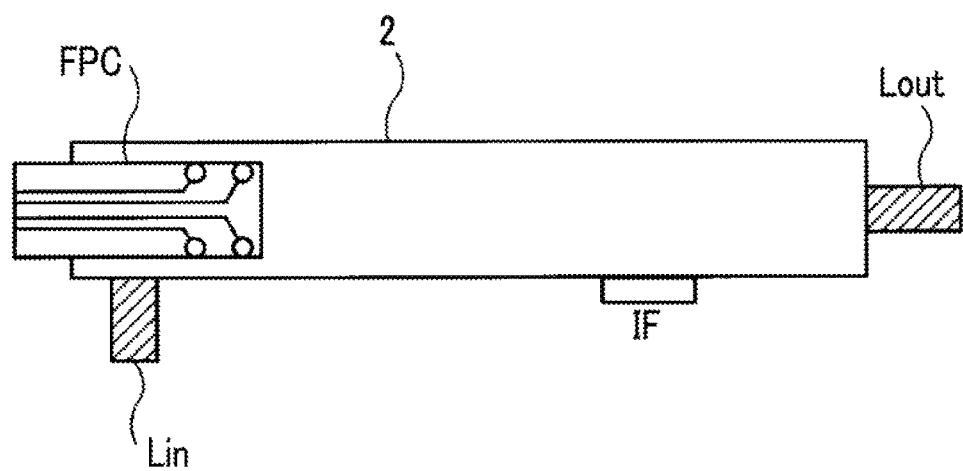
FIG. 9 is a view of the optical modulator in FIG. 8 seen from a bottom surface side.

FIG. 8 and FIG. 9 illustrate a second example of the optical modulator OM that is embedded in the optical communication module. A difference from the example in FIG. 5 and FIG. 6 is in that two relay substrates (RS3 and RS4) are disposed in the container 2 with the optical modulation element OME interposed therebetween. The other configurations are the same as in FIG. 5 and FIG. 6.

In the example illustrated in FIG. 8, an input interconnection from one wiring substrate FPC is divided to two relay substrates, a high-frequency signal is introduced from both long-side side lateral surfaces of the optical modulation element. According to this, it is possible to suppress lengthening of an electrical connection in the wiring substrate or the relay substrate, and thus it is possible to suppress a propagation loss of the high-frequency signal.

Figure 10:
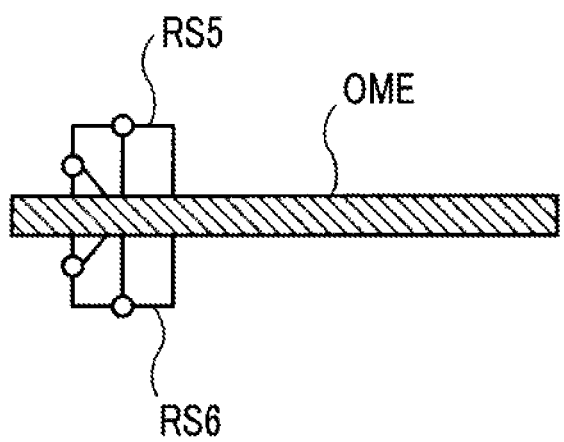
FIG. 10 is a view illustrating an application example of the second example of the optical modulator of the invention.

According to the second example of the optical modulator as illustrated in FIG. 8 and FIG. 9, in the relay substrates (RS3 and RS4), terminal portions, which are connected to lead pins, are formed on a lateral surface, which is opposite to a lateral surface facing the optical modulation element OME, of the relay substrate. In contrast, as in an application example illustrated in FIG. 10, terminal portions (portions indicated by a round mark) may be provided on a lateral surface (left lateral surface in FIG. 7), which is perpendicular to the long-side side lateral surface of the optical modulation element OME, of the relay substrates RS5 and RS6 so as to set the electrical interconnection to be shorter. In addition, as illustrated in FIG. 10, it is also possible to dispose an input terminal portion on another lateral surface of the relay substrate so as to prevent cross-talk between high-frequency signals.

As described above, according to the invention, it is possible to provide an optical communication module capable of suppressing a propagation loss of a high-frequency signal while realizing miniaturization of the optical communication module, and an optical modulator that is used in the optical communication module.

What is claimed is:
1. An optical communication module, comprising:
   an optical modulator that includes an optical modulation element housed in a rectangular parallelepiped container;
   a driver circuit that inputs a high-frequency signal to the optical modulation element; and
   a housing that houses the optical modulator and the driver circuit therein,
   wherein an optical input port and an optical output port of the optical modulator are disposed on the same surface of the rectangular parallelepiped container or are respectively disposed on surfaces, which are perpendicular to each other, of the rectangular parallelepiped container, an electrical interface is provided on one lateral surface of the housing, an optical interface is provided on another lateral surface, which is opposite to the lateral surface, of the housing, one end of a wiring formed in a wiring substrate, which is configured to introduce the high-frequency signal to the optical modulation element, is led out from one short-side side of the rectangular parallelepiped container of the optical modulator, the driver circuit is disposed between the short-side side of the optical modulator and the electrical interface and be electrically connected to the electrical interface and the end of the wiring formed in the wiring substrate, a relay substrate, which is configured to introduce the high-frequency signal from another end of the wiring formed in the wiring substrate to the optical modulation element, is provided inside the container, and the relay substrate is disposed along one long-side side lateral surface or both long-side side lateral surfaces of the optical modulation element for the high-frequency signal to be introduced from at least one of the long-side side lateral surfaces of the optical modulation element.

2. The optical communication module according to claim 1, wherein an optical receiver is provided in the housing.

3. The optical communication module according to claim 1, wherein a digital signal processing circuit is provided in the housing.

4. The optical modulator according to claim 1, wherein optical path converting means is disposed on an input side or an emission side of a light beam with respect to the optical modulation element.

5. The optical modulator according to claim 4, wherein a substrate that constitutes the optical modulation element is a lithium niobate substrate.

6. The optical modulator according to claim 1, wherein a DC input terminal configured to apply a DC bias to the optical modulation element, or a monitor signal output terminal configured to monitor a light wave propagating through the inside of the optical modulation element is disposed on one long-side side of the rectangular parallelepiped container.

* * * * *